No. 810,816. PATENTED JAN. 23, 1906.
N. J. SHIMMEL.
VEGETABLE DISINTEGRATOR.
APPLICATION FILED JAN. 13, 1905.

Witnesses:
K. H. Butler
E. E. Potter

Inventor
Newton J. Shimmel
By H. C. Evert & Co.
Attorneys

UNITED STATES PATENT OFFICE.

NEWTON J. SHIMMEL, OF SUMMERVILLE, PENNSYLVANIA.

VEGETABLE-DISINTEGRATOR.

No. 810,816.     Specification of Letters Patent.     Patented Jan. 23, 1906.

Application filed January 13, 1905. Serial No. 240,893.

*To all whom it may concern:*

Be it known that I, NEWTON J. SHIMMEL, a citizen of the United States of America, residing at Summerville, in the county of Jefferson and State of Pennsylvania, have invented certain new and useful Improvements in Vegetable-Disintegrators, of which the following is a specification, reference being had therein to the accompanying drawings.

This invention has relation to apparatus for disintegrating or mashing vegetables, and has for its object the provision of a novel device for speedly and effectively mashing and disintegrating vegetables of any character, particularly potatoes or such other vegetables as it may be desired to reduce to finely-divided conditions.

In carrying my invention into effect I provide a vessel in the form of a hollow cylinder open at both ends and mounted upon legs. The cylinder is formed with a flange at its lower end which sustains a removable screen, and in connection with said cylinder I use an implement for pressing the vegetables that are placed in the cylinder through the screen, which instrument I preferably construct in the form of a disk of the same diameter as the vessel, and this disk is provided with a handle by means of which it can be pressed down upon the vegetables contained in the vessel first above mentioned.

Figure 1:
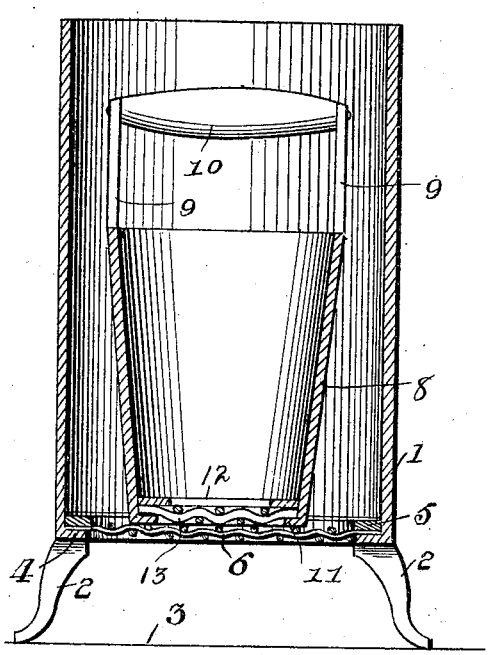
Figure 2:
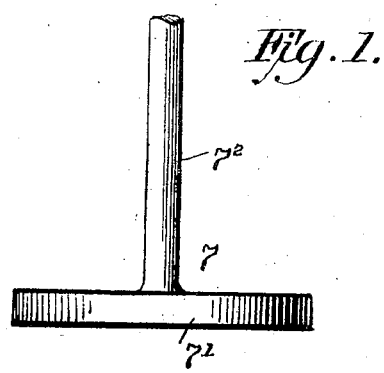
Figure 3:
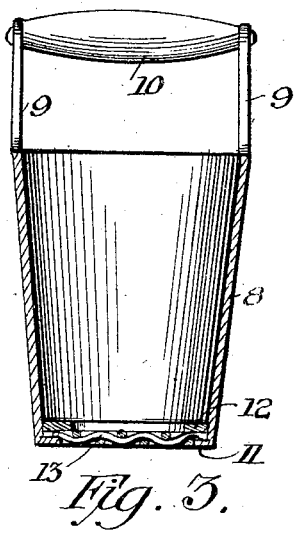
Figure 4:
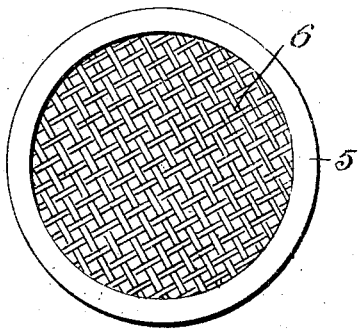
Figure 5:
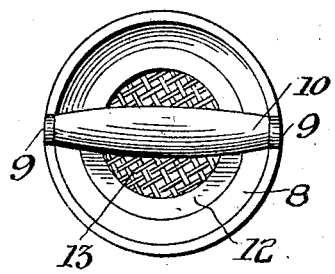

In the accompanying drawings, Figure 1 is a vertical central sectional view of the hollow cylindrical vessel in which the vegetables are placed when they are to be mashed and showing therein the mashing instrument illustrated in Fig. 3. Fig. 2 is a side elevation of a form of implement which I may use in connection with the vessel shown in Fig. 1. Fig. 3 is a vertical central sectional view of the form of mashing implement shown in Fig. 1. Fig. 4 is a plan view of the screen shown at the bottom of the vessel illustrated in Fig. 1, and Fig. 5 is a top view of the implement shown in Fig. 3.

As shown in Fig. 1, the hollow cylindrical vessel 1 is open at top and bottom and is mounted on legs 2 2, which support it upon and above the surface 3, which may be the surface of a table or any other surface upon which the disintegrated vegetables will lie when forced from the vessel 1. The vessel 1 is formed with an annular flange 4 on its bottom edge, and upon said flange a removable screen is sustained when the vessel is in use, the said screen being composed of the annular ring 5, to which a circular sheet of woven wire or other suitable foraminous material 6 is attached in any suitable manner.

The vessel and screen shown in Fig. 1 can be used with the implement 7 shown in Fig. 2, which consists of a disk 7' of the same diameter as the vessel shown in Fig. 1, this disk being provided with a handle $7^2$. The vessel 8 has an annular flange 11 at its lower edge, and within said vessel is arranged an annular ring 12, and between said annular ring, which is fixed in the vessel 8 in any suitable manner, such as by soldering it to the inner walls of the vessel, is a wire mesh 13.

The implement shown in detail in Fig. 2 is adapted for use solely in the receptacle shown in Fig. 1, while the implement shown in Fig. 3 is adapted for use either in the vessel shown in Fig. 1 or in a separate receptacle. It is advantageously used, however, in the vessel shown in Fig. 1, and when used in this vessel the vegetables are forced through the screen-bottom of the vessel 1, and also through the screen-bottom of the vessel or mashing implement 8, the mashing of the vegetables being in this instance exceedingly rapid, and those which enter the vessel 8 may be emptied therefrom into the vessel 1 again for further mashing or disintegration.

Having described my invention, I claim—

In a device for disintegrating vegetables, the combination with a vessel mounted on legs and having a removable foraminated bottom, of an implement adapted to be introduced into said vessel to press the vegetables through said foraminated bottom, the said implement comprising a vessel having a foraminated bottom and a handle.

In testimony whereof I affix my signature in the presence of two witnesses.

NEWTON J. SHIMMEL.

Witnesses:
    H. C. EVERT,
    E. E. POTTER.